United States Patent [19]

Jung

[11] Patent Number: 5,590,946
[45] Date of Patent: Jan. 7, 1997

[54] GENERATOR FOR BICYCLE AND A LIGHT SYSTEM USING THE SAME

[76] Inventor: Ruey-feng Jung, No. 12, Changjung Rd., Kaoshu Hsiang, Pingtung Hsien, Taiwan

[21] Appl. No.: 396,461

[22] Filed: Feb. 28, 1995

[51] Int. Cl.⁶ .................................................. B62J 6/06
[52] U.S. Cl. .......................... 362/72; 362/192; 340/432
[58] Field of Search ........................... 362/72, 78, 192, 362/193; 340/480, 432

[56] References Cited

U.S. PATENT DOCUMENTS

| | | | |
|---|---|---|---|
| 4,191,988 | 3/1980 | Kumakura | 362/72 |
| 5,128,840 | 7/1992 | Seki et al. | 362/72 |

FOREIGN PATENT DOCUMENTS

| | | | |
|---|---|---|---|
| 3241909 | 5/1984 | Germany | 340/432 |
| 3911627 | 2/1990 | Germany | 340/432 |
| 5162674 | 6/1993 | Japan | 362/72 |
| 7514257 | 6/1976 | Netherlands | 340/432 |
| 9418056 | 8/1994 | WIPO | 362/72 |

*Primary Examiner*—Denise L. Gromada
*Assistant Examiner*—Thomas M. Sember
*Attorney, Agent, or Firm*—Welsh & Katz, Ltd.

[57] ABSTRACT

A generator for a bicycle light system includes a plurality of stators secured adjacent to both sides of a bicycle wheel and a plurality of rotors provided on the bicycle wheel between the stator for generating an electric current to the battery thereby providing a power source to a lamp of the light system.

10 Claims, 3 Drawing Sheets

GENERATOR FOR BICYCLE AND A LIGHT SYSTEM USING THE SAME

BACKGROUND OF THE INVENTION

The present invention relates to a generator for a bicycle, and particularly to a light system which uses the generator.

A conventional generator for a bicycle has a rotor driven by an outer surface of a rotating tire of the bicycle to generate an electric current when a rider pedals the bicycle. A headlight is secured to a front of the bicycle for receiving the electric current from the generator to provide a light source for the rider.

However, as the rotor of the generator is rotated by contacting the outer surface of the rotating tire, the surface of the tire will be worn out by the rotor.

Further, as the rotor is urged against the outer surface of the tire, the rider has to use a greater force to overcome the resistance of the generator when providing current to the headlight. Furthermore, as the electric current is directly supplied to the headlight, when the rider rides faster, the headlight will be brighter. However, if the rider rides slower, the headlight will be too dim for the rider to see by. Additionally, the headlight is not lit if the bicycle is stopped. Thus, the safety of the rider is not secured.

SUMMARY OF THE INVENTION

An object of the present invention is to provide a light system for a bicycle wherein the brightness of the headlight will not be influenced by a speed variation of the bicycle.

Another object of the present invention is to provide a light system for a bicycle which will not damage the surface of a bicycle tire.

A further object of the present invention is to provide a light system for a bicycle which will reduce an amount of resistance caused by rotating the generator.

Still a further object of this invention is to provide a light system for a bicycle which may remain lit when the bicycle is stopped.

According to the present invention, a light system for a bicycle comprises a headlight for providing a light source to a rider, a battery connected in parallel to the headlight for providing an electric current to the headlight, and a generator composed of a plurality of stators secured adjacent to both sides of a bicycle wheel and a plurality of rotors provided on the bicycle wheel between the stators for generating an electric current to the battery.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
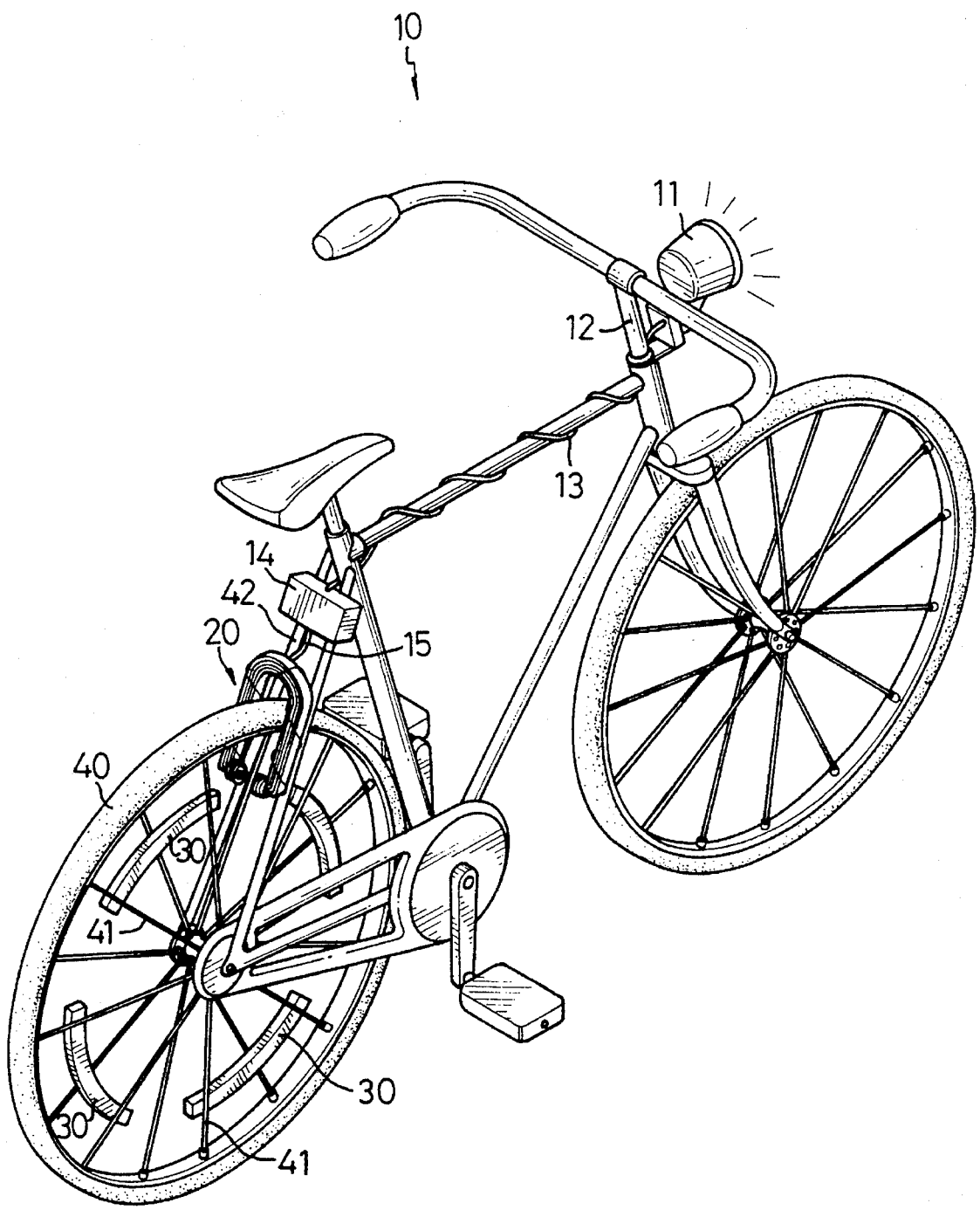
FIG. 1 is a perspective view of a bicycle provided with a light system according to the present invention.

Referring to FIG. 1, there is shown a perspective view of a bicycle 10 provided with a light system in accordance with the present invention. As shown, the light system includes a headlight 11 mounted on a stem 12 with a cable 13 connected to a battery set (not shown) in a container 14, a stator 20 is connected to the battery set via a cable 15, and a plurality of rotors 30 secured on a plurality of spokes 41 of a wheel 40. The container 14 for holding the battery set 50 (in FIG. 4) is secured on a part of the bicycle 10 such as a seat stay 42 and the stator 20 is also mounted to a part of the bicycle 10, such as the seat stay 42 of the bicycle 10. Each of the rotors 30 is preferably made of permanent magnet being of an arched strip having a positive polarity at a first surface and a negative polarity at a second surface opposite the first surface thereby forming a magnetic field required by the generator.

Figure 2:
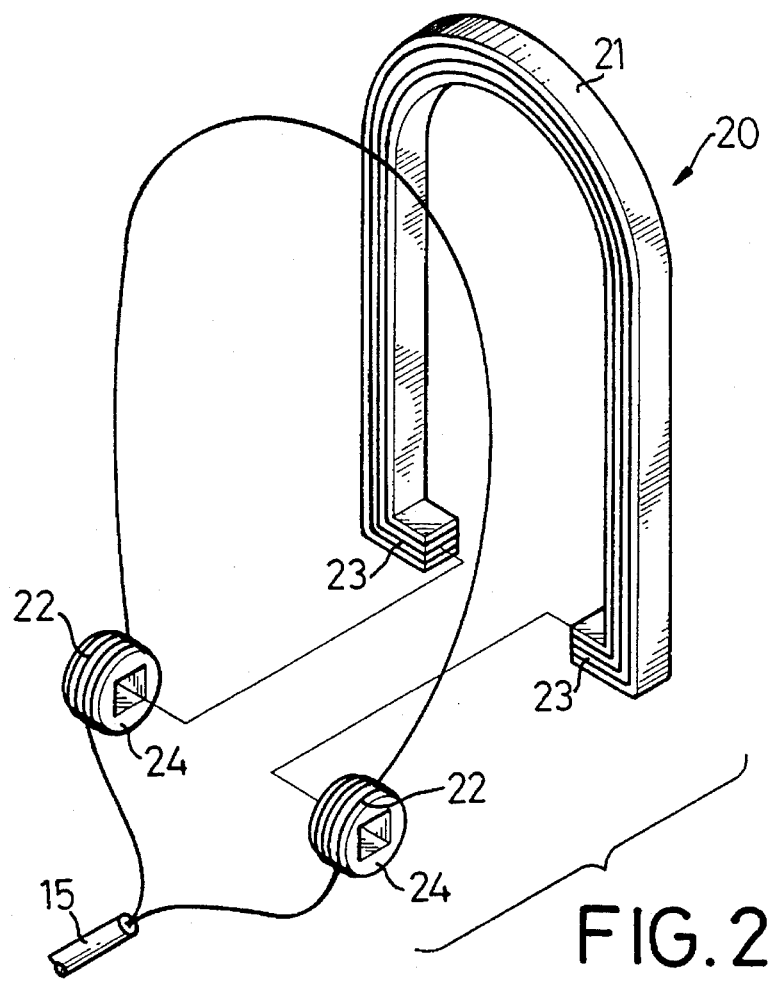
FIG. 2 is a perspective exploded view of a stator according to the present invention.

As shown in FIG. 2, a stator 20 is composed of a U-shaped core 21 and two series-connected windings 22 secured on two inwardly protruding ends 23 of the core 21 via two bobbins 24. The windings 22 consist of a plurality of insulated coils. The U-shaped core 21 is formed of laminated U-cross-sectional iron sheets. Two ends of the stator 20 are connected to the battery set 50 (in FIG. 4) via a cable 15.

Figure 3:
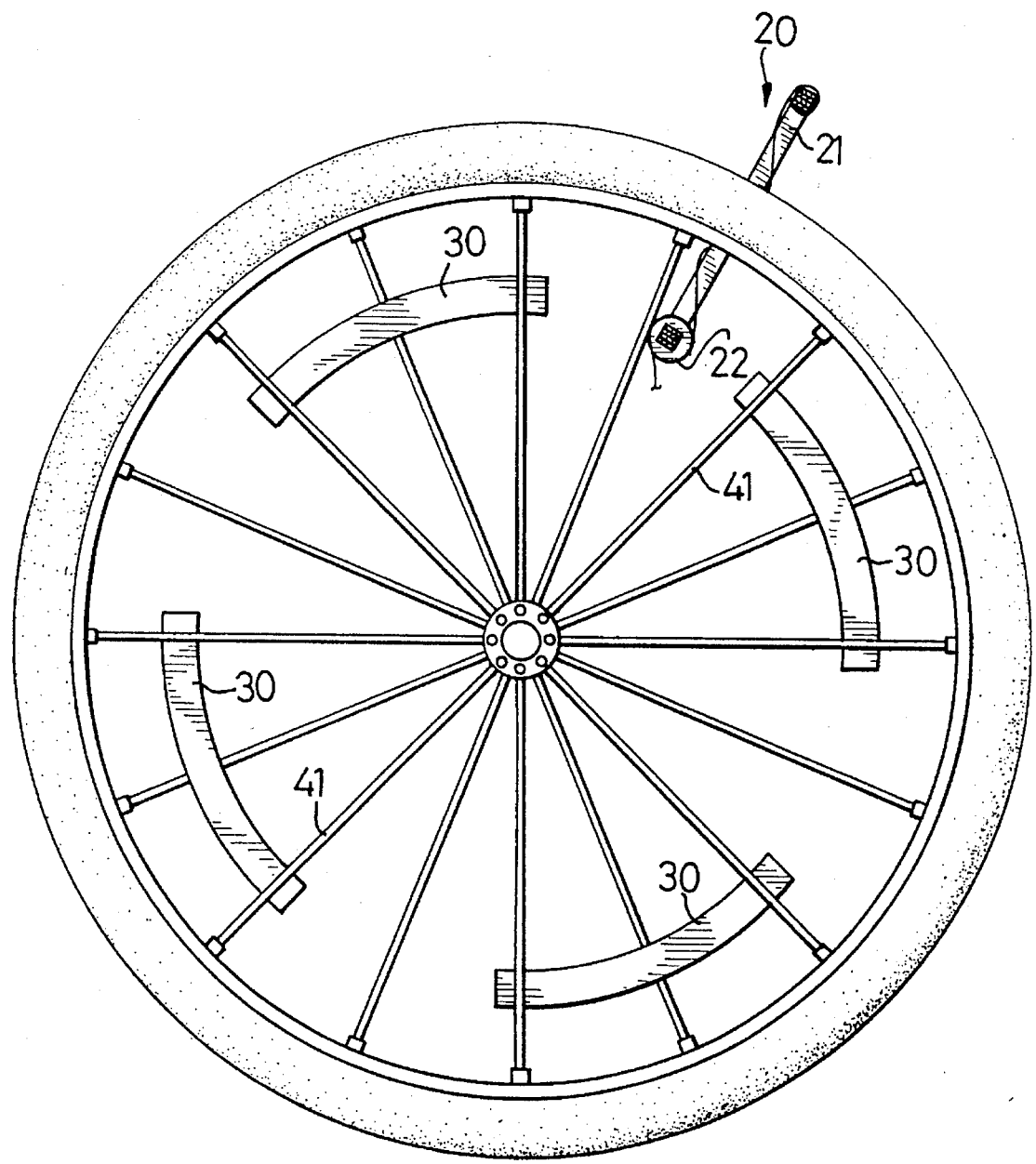
FIG. 3 is a view of a generator according to the present invention.

Referring to FIG. 3, the rotors 30 secured on the spokes 41 will pass through a span defined between the windings 22 secured on the core 21 of the stator 20, so that magnetic fields of the rotors 30 will pass through the windings 22 and an electromotive force i.e., electric current will be induced in the coils of the windings 22.

Figure 4:
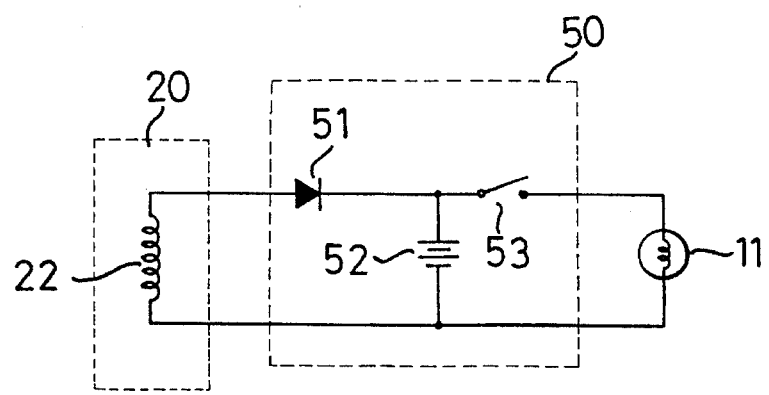
FIG. 4 is a circuit diagram for used in a light system according to the present invention.

As shown in FIG. 4, a circuit diagram according to the present invention comprises a rotor 20, a battery set 50 held in a container 14 (in FIG. 1), and a lamp 11. The winding 22 of the rotor 20 is connected to the lamp 11 via the battery set 50 which is composed of a diode 51, a battery 52 and a switch 53 connected between the battery 52 and the lamp 11 for controlling the on/off status of the lamp 11. When the bicycle is in motion, a current generated by the winding 22 will charge the battery 52 through the diode 51 and light the lamp 11 by closing the switch 53. If the bicycle stops, the diode 51 may prevent a current from flowing from the battery 52 to the winding 22 and the battery 52 may provide a current to turn on the lamp 11 by closing the switch 53.

Although the invention has been explained in relation to its preferred embodiment, it is to be understood that many other possible modifications and variations can be made without departing from the spirit and scope of the invention as hereinafter claimed.

What is claimed is:

1. A generator for a bicycle having two seat stays extending to a hub of a wheel, comprising:

a laminated U-shaped core mounted on the seat stays and having two distal ends extending toward the hub of the wheel;

two series-connected windings secured on the ends of the U-shaped core; and a plurality of rotor means mounted on the wheel in a position between the ends of the U-shaped core for causing the windings to induce an electric current when the wheel rotates.

2. A generator as claimed in claim 1 wherein said rotor means are permanent magnets.

3. A generator as claimed in claim 2 wherein said permanent magnets are formed of arched strips each having two opposite surfaces with opposite magnetic polarities thereon.

4. A generator as claimed in claim 1 wherein said U-shaped core has inwardly facing protrusions at the ends thereof for the windings to mount thereon.

5. A generator as claimed in claim 4 further comprising a bobbin provided on each of the protrusions for the windings to mount thereon.

6. A light system for a bicycle having two seat stays extending to a hub of a wheel, comprising:

a lamp;

battery means connected in parallel to the lamp;

a laminated U-shaped core mounted on the seat stays and having two distal ends extending toward the hub of the wheel;

two series-connected windings secured on the ends of the U-shaped core; and a plurality of rotor means mounted on the wheel in a position between the ends of the U-shaped core for causing the windings to induce an electric current to the battery means via a diode when the wheel rotates.

7. A light system as claimed in claim 6 wherein said rotor means are permanent magnets.

8. A light system as claimed in claim 7 wherein said permanent magnets are formed of arched strips each having two opposite surfaces with opposite magnetic polarities thereon.

9. A light system as claimed in claim 6 wherein said U-shaped core has inwardly facing protrusions at the ends thereof for the windings to mount thereon.

10. A light system as claimed in claim 9 further comprising a bobbin provided on each of the protrusions for the windings to mount thereon.

* * * * *